Figure 1:
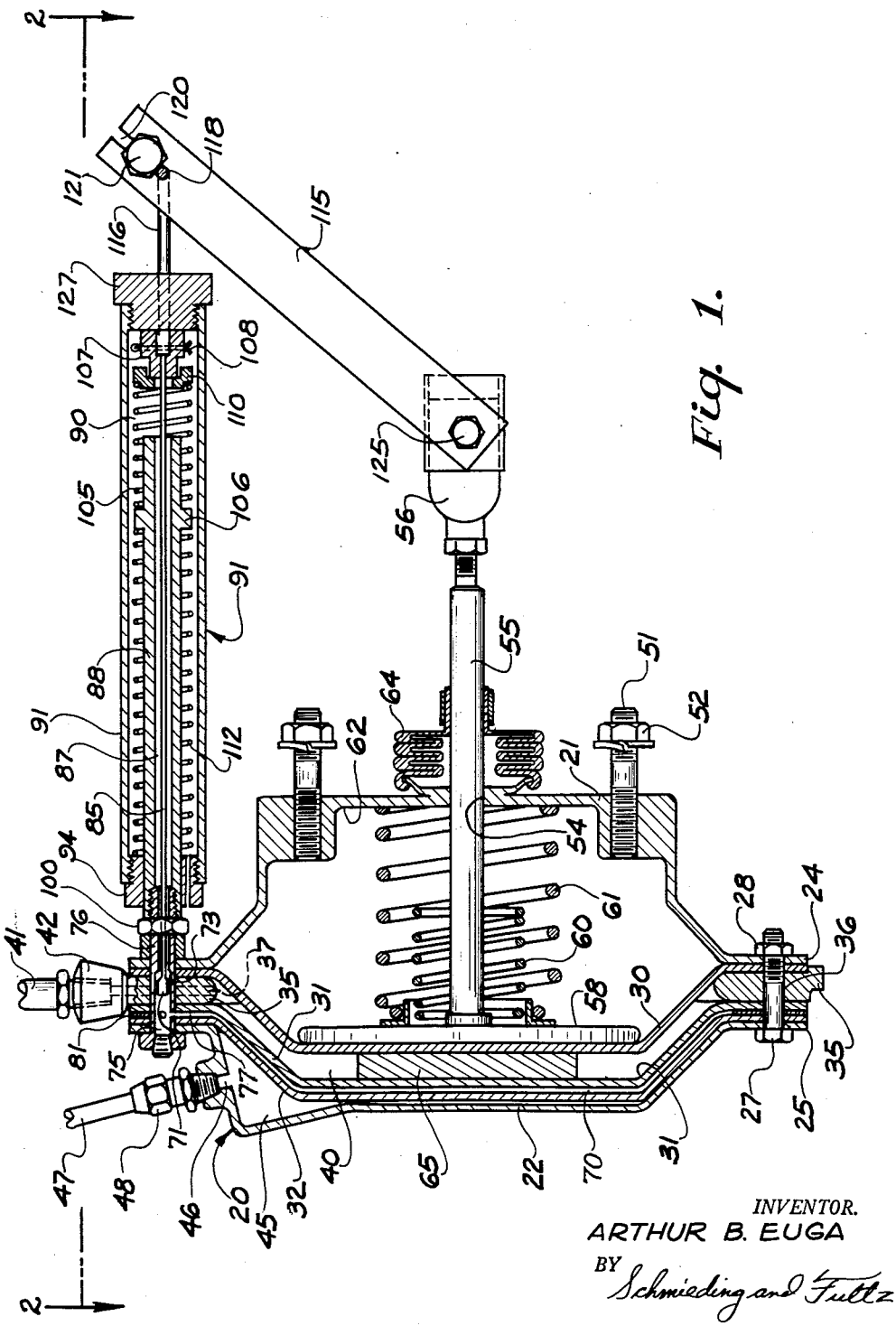

May 9, 1961 — A. B. EUGA — 2,983,257
FLUID ACTUATED BRAKE CYLINDER
Filed Dec. 30, 1957 — 3 Sheets-Sheet 1

INVENTOR.
ARTHUR B. EUGA
BY Schmieding and Fultz
ATTORNEYS

May 9, 1961

A. B. EUGA 2,983,257

FLUID ACTUATED BRAKE CYLINDER

Filed Dec. 30, 1957

3 Sheets-Sheet 3

INVENTOR.
ARTHUR B. EUGA
BY
Schmieding and Fultz
ATTORNEYS

United States Patent Office 2,983,257
Patented May 9, 1961

2,983,257
FLUID ACTUATED BRAKE CYLINDER
Arthur B. Euga, 728½ Franklin Ave., Columbus, Ohio
Filed Dec. 30, 1957, Ser. No. 705,885
10 Claims. (Cl. 121—48)

This invention relates to brake systems for vehicles and particularly to a novel fluid actuated brake cylinder for such systems.

This application is a continuation-in-part of my co-pending application Serial No. 564,315, filed February 8, 1956, now Patent No. 2,871,827, which is in turn a continuation-in-part of my application Serial No. 176,785, filed July 31, 1950, the latter application being now abandoned.

In general, the fluid actuated brake cylinder of the present invention is adapted for use on vehicles which are equipped with both service brake fluid system and a separate auxiliary brake fluid system. The brake cylinder construction of the present invention is similar to the constructions disclosed in my above mentioned co-pending application Serial No. 564,315 in that it consists of a casing provided with a plurality of flexible diaphragms dividing the interior of the casing into a sealed service brake chamber and a separate sealed auxiliary brake chamber. The present construction is also similar in that two separate diaphragms are provided intermediate the service brake chamber and the auxiliary brake chamber with the space intermediate the two diaphragms being vented to atmosphere to prevent the accumulation of any air that may leak to the space between the two diaphragms.

The brake cylinder construction of the present invention, however, constitutes an improvement over the similar constructions disclosed in the above mentioned co-pending application in that it includes a novel valve mechanism for automatically closing the vent for the space between the two flexible diaphragms. Such valve mechanism for closing the vent is automatically actuated when a brake application is made and serves to prevent the loss of either the service brake fluid system or the auxiliary brake fluid system in the event of rupture of either or both of the two flexible diaphragms between the auxiliary and service chambers in the brake cylinder. It should be pointed out that the above mentioned vent closing valve mechanism is normally open to normally vent the space between the two diaphragms so that any slow leakage of fluid, as would be caused by a minute hole in a diaphragm, will escape through the vent to atmosphere and hence not cause the accumulation of air between the diaphragms. In the event, however, a substantial rupture occurs in either or both of the diaphragms the valve mechanism serves to close the vent whereby air from either the service system or the auxiliary system, or from both systems, will not be lost when a brake application is being made.

It is therefore an object of the present invention to provide an improved fluid actuated brake cylinder for use in a brake system which includes both a service fluid system and a separate auxiliary fluid system.

It is another object of the present invention to provide a brake cylinder of the type described which utilizes two moveable walls or flexible diaphragms as separating means between a service air chamber and an auxiliary air chamber, said cylinder including means for venting the space between said moveable walls or diaphragms and valve mechanism for automatically closing said vent responsive to actuation of said cylinder.

Further objects and advantages of the present invention will be apparent from the following description, reference being had to the accompanying drawings wherein a preferred form of embodiment of the invention is clearly shown.

Figure 2:
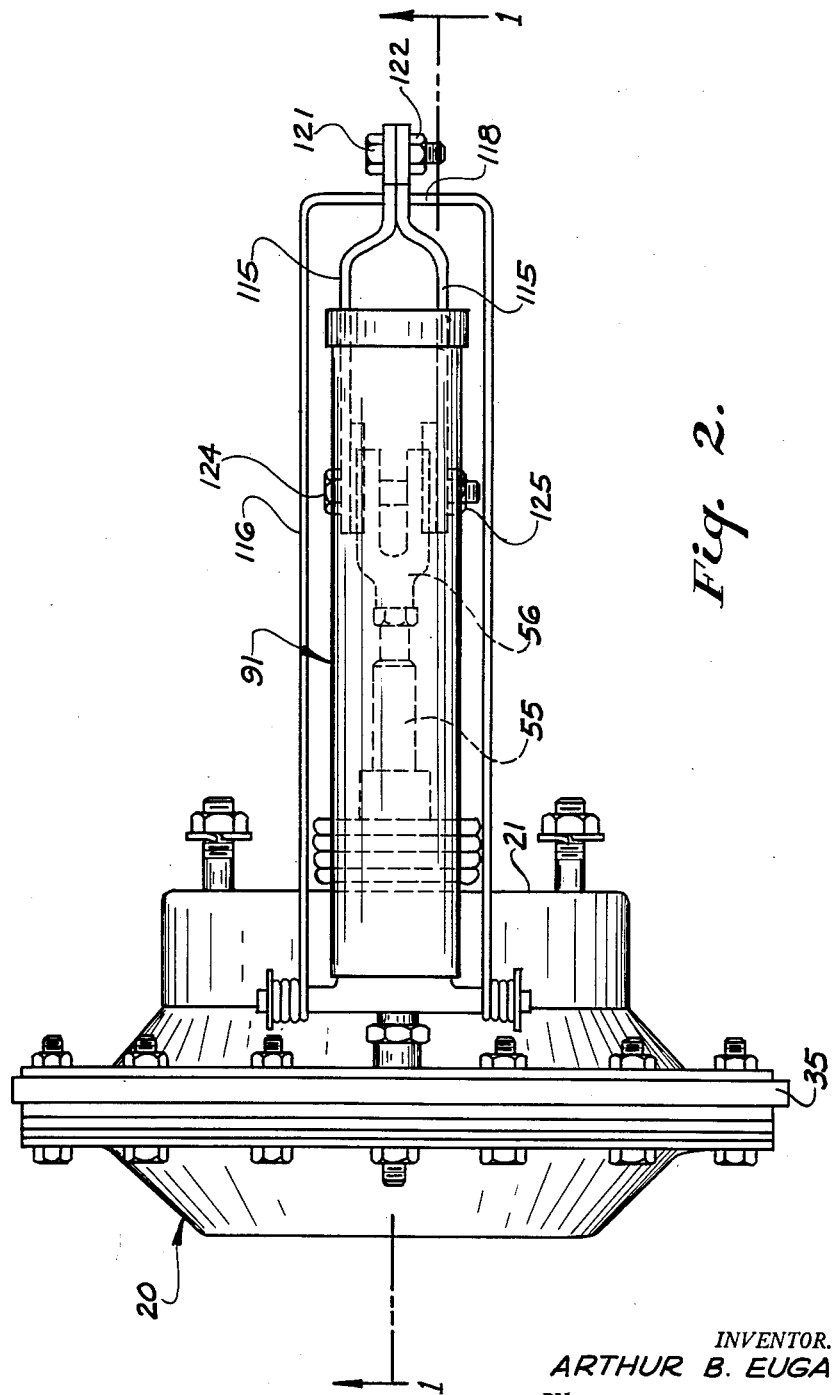
Figure 3:
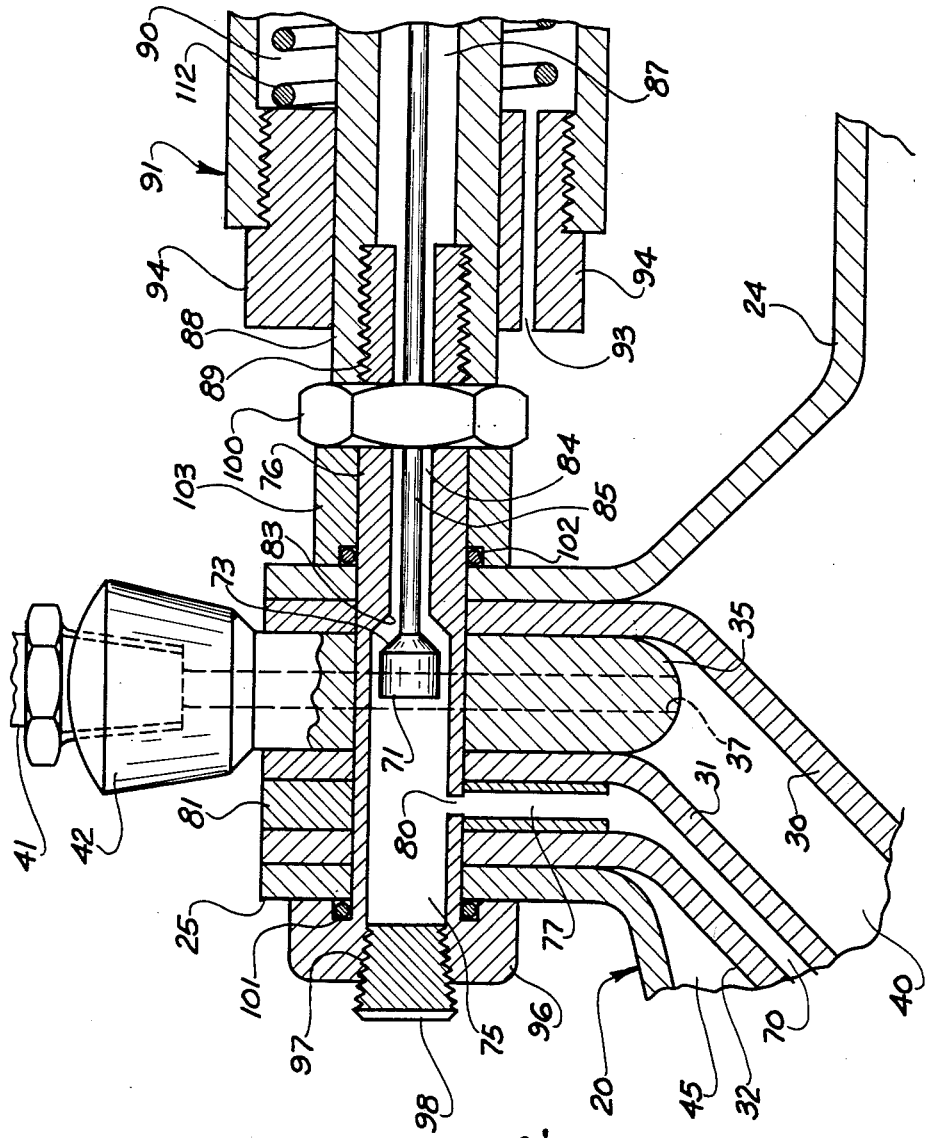

In the drawing:
Figure 1 is a side sectional view of a fluid actuated brake cylinder constructed according to the present invention, said section being taken along the line 1—1 of Figure 2;
Figure 2 is a top elevational view of the fluid actuated brake cylinder of Figure 1; and
Figure 3 is a side sectional view of a vent and associated valve mechanism constituting a portion of the apparatus of Figures 1 and 2, the section being taken along the line 1—1 of Figure 2.

Referring in detail to the drawing Figure 1 illustrates a fluid actuated brake cylinder indicated generally at 20 which cylinder includes a forward casing portion 21 and a rear casing portion 22 provided with peripheral flange portions 24 and 25, respectively, joined together by a plurality threaded elements 27 and 28. Cylinder 20 includes a first flexible diaphragm 30, a second flexible diaphragm 31 and a third flexible diaphragm 32 clamped between the flanged portions 24 and 25. An annular spacer member 35, disposed between diaphragms 30 and 31 is provided with a plurality of holes 36 through which bolts 27 are extended. Annular spacer member 35 includes a radially extending passage 37 communicating with a first sealed chamber 40. A service line 41 connects a passage 37 of spacer member 35 at a threaded fitting 42. Cylinder 20 includes a second sealed chamber 45 provided with a fluid intake opening 46 communicating with an auxiliary fluid system via line 47 connected at a threaded fitting 48.

The two adjacently disposed diaphragms 31 and 32 form a double flexible wall means separating sealed chamber 40 from sealed chamber 45. It will be understood that chamber 40 can be connected with a service brake fluid circuit of the braking system and chamber 45 can be connected with a fluid circuit of an auxiliary braking system whereby chamber 40 becomes the service brake chamber and chamber 45 becomes the auxiliary brake chamber. These connections can be interchanged so that chamber 40 will function as an auxiliary brake chamber and chamber 45 will function as a service brake chamber.

The forward casing portion 21 of cylinder 20 may be provided with studs 51 and nuts 52 for securing the cylinder to the vehicle. The forward casing portion 21 includes a hole 54 through which is extended a brake actuating rod 55 provided with suitable means, such as clevis 56, for connecting rod 55 to conventional means, such as a slack adjustor and cams, not illustrated, for operating the brake shoes of the vehicle. The inner end of brake actuating rod 55 carries a plate element 58 which is contacted by a substantial portion of the area of flexible diaphragm 30. Compression springs 60 and 61 are disposed between plate element 58 and an inner surface 62 of the casing for urging the plate element 58 and diaphragm to the rearward position illustrated in Figure 1. A flexible boot 64 may be provided at the junction of actuating rod 55 and casing portion 21 to serve as a dirt seal for hole 54.

With continued reference to Figure 1, a spacer member 65 is shown disposed between diaphragms 30 and 31 with such spacer member being secured to one of the confronting surfaces of the diaphragms. Spacer member 65 is preferably formed of the same material as the flexible diaphragms, such as synthetic rubber, and provides means for transmitting force from rear flexible diaphragms 31 and 32 to plate element 58 and actuating rod 55 when chamber 45 is pressurized.

Referring next to Figures 1 and 3 the space 70 between diaphragms 30 and 31 communicates with a vent chamber 75 via a radial passage 77 in spacer ring 81. Vent chamber 75 is formed in a special bolt 76 that extends through holes in flanges 24 and 25 of the casing portions and through the peripheral portions of the diaphragms. Special bolt 76 includes a tapered seat portion 83 which is engaged by a conforming seat portion 73 on a moveable valve element 71. As is best seen in Figure 3, the right end of special bolt 76 includes an axial passage 84 which connects vent chamber 75 with a hole 87 formed axially through a guide member 88 secured to the right end of special bolt 76 at a threaded junction 89. Hole 87 in turn communicates with a chamber 90 formed by a spring casing 91 slideably carried on guide member 88. Chamber 90 is vented to atmosphere at a passage 93 formed in an end closure plug 94 of spring casing 91. Hence it will be understood that when valve element 71 is away from its seat 83 any air present in space 70 between diaphragms 30 and 31 is vented to atmosphere via passage 77, hole 80, vent chamber 75, passage 84, passage 87, chamber 90, and passage 93 to atmosphere.

The head 96 of special bolt 76 includes a threaded hole 97 fitted with a removable plug 98 to provide means for assembling a valve actuating rod 85 and valve element 71 within bore 84 and chamber 75 of special bolt 76.

The right end of special bolt 76 is threaded at 89 and carries a nut 100. When nut 100 is tightened the flanges 24 and 25, spacer rings 35 and 81, and diaphragms 30, 31, and 32 are clamped together. A resilient seal 101 under head 96 and a resilient seal 102 at the junction of spacer member 103 with flange 24 are provided to prevent the leakage of fluid around the exterior of special bolt 76.

It will be understood from consideration of Figure 1 that the travel of brake actuating rod 55 is much greater than the travel of valve element 71 and since valve element 71 is actuated by movement of brake actuating rod 55 it is necessary to provide a lost motion connection in the mechanical linkage which effects such actuation.

As seen in Figure 1, valve actuating rod 85 carries a removable end member 107 which is secured to the end of rod 85 by a cotter pin 108. A spring seat washer 110 and a valve closer compression spring 105 are interposed between a moveable end member 108 and a shoulder 106 formed on the ends of guide member 88. Spring 105 constantly urges valve actuating rod 85 towards the right or closed position. A valve opener compression spring 112 interposed between shoulder 106 and end plug 94 constantly urges spring casing 91 towards the left which in turn urges valve actuating rod 85 and its removable end member 107 towards the left or open position. Such open position is the normal position of the mechanism when a braking application is not being made.

As seen in Figures 1 and 2, brake actuating rod 55 is connected to spring casing 91 by means of metal straps 115 and a bale 116, the latter including a transverse portion 118 which is carried in a slot 120 formed in the upper ends of metal straps 115. A bolt 121, and nut 122 retain transverse portion 118 of bale 116 in slot 120 and provide means for connecting and removing the bale from the metal straps. The lower ends of metal straps 115 are attached to clevis 56 on rod 55 by a bolt 124 and nut 125.

In operation of the device of the present invention, when a brake application is made by pressurizing either service chamber 40 or auxiliary chamber 45, brake actuating rod 55 is extended. This moves metal straps 115, bale 116, and spring casing 91 forwardly, or to the right, as seen in Figure 1, whereby right end plug 127 is moved away from engagement with end member 107 on rod 85. This action compresses opener spring 112 and allows closer spring 105 to move valve actuating rod 85 to the right whereby valve element 71 moves against seat 83. This closes vent chamber 75 and prevents the escape of air from space 70 intermediate diaphragms 31 and 32.

After valve element 71 has been moved against its seat 83, which occurs very rapidly at initial movement of brake actuating rod 55, spring casing 91 is free to continue to move to the right, as viewed in Figure 1, along the relatively long axial extent of guide member 88. Hence it will be understood that such continued movement of spring casing 91 along guide member 88 provides the previously mentioned lost motion connection between valve member 71 and brake actuating rod 55.

After a brake application has been made, termination of such application serves to vent service chamber 40, or auxiliary chamber 45, as the case may be, whereby return spring 61 retracts valve actuating rod 55 in the conventional manner. This action moves metal straps 115, bale 116, and spring casing 91, to the left as viewed in Figure 1. After the occurrence of lost motion travel of valve casing 91, along guide member 88, end plug 127 engages end member 107 whereby valve actuating rod 85 is moved to left, as viewed in Figure 1, causing valve element 71 to open. When valve element 71 opens, space 70 intermediate diaphragms 31 and 32 is vented to atmosphere in the manner previously described.

In continuing the description of the operation of the subject mechanism, it should be pointed out that the two separate diaphragms 31 and 32 are provided between service chamber 40 and auxiliary chamber 45 so that in the event of failure of one of these diaphragms the other diaphragm will still isolate the two separate service and auxiliary fluid systems of the type described in my previously mentioned co-pending application Serial No. 564,315. When two diaphragms 31 and 32 are employed, however, it is necessary to provide means for preventing the accumulation of air between the diaphragms in the event that either of them should acquire a slow leak such as would be caused by a minute hole through either of the diaphragms. Hence the previously described normally open vent for space 70 between the diaphragms is necessitated. In the event, however, one of the diaphragms 31 or 32 should become severely ruptured, and if the vent were always maintained open, it will be understood that when the chamber confined by the particular ruptured diaphragm 31 or 32 is pressurized to effect a brake operation, then in that event the fluid released to the chamber would escape via the severe rupture and the vent causing one of two separate fluid systems to become inoperative. Due to the provision of previously described valve mechanism for closing the vent, however, it will be understood that if service chamber 40 is pressurized and diaphragm 31 is ruptured then diaphragm 32 will serve as a rear confining wall for service chamber 40 and since valve 71 is closed by actuation of the brakes, service chamber 40 can still be pressurized. On the other hand, if diaphragm 32 is severely ruptured and auxiliary chamber 45 is pressurized, then diaphragm 31 will serve as the front confining wall for auxiliary chamber 45 and since valve element 71 is closed auxiliary chamber 45 can still be pressurized In the event that both diaphragm 31 and diaphragm 32 should be simultaneously severely ruptured the service fluid system communicating with service chamber 40 and the auxiliary fluid system communicating with auxiliary chamber 45 will no longer be isolated one from the other. This condition, however, will not prevent actuation of the brake cylinder which actuation can be accomplished by simultaneously actuating the service brake valve and the auxiliary brake valve, described and illustrated in my above mentioned co-pending application Serial No.

564,315. The reason the driver must actuate both the service brake valve and the auxiliary brake valve when both diaphragms 31 and 32 are ruptured is due to the fact that these valves are normally vented valves. A vented service brake valve is a valve of the type which, when a brake actuation is not being made and the valve is in a closed position, serves to vent the service chamber 40 of the brake cylinder to atmosphere. Similarly, the vented auxiliary brake valve is a valve of the type which, when the auxiliary system is not being actuated and the auxiliary brake valve is closed, serves to vent auxiliary chamber 45 of the brake cylinder to atmosphere. Hence it will be understood that in the event both diaphragms 31 and 32 are ruptured, whereby the service fluid system and auxiliary fluid system are no longer isolated, it is necessary for the driver to actuate both of the valves to close the portions of the valves that vent the respective chambers 40 and 45 to atmosphere.

It should further be pointed out that an inherent advantage of the present construction results from the fact that both service chamber 40 and auxiliary chamber 45 can be simultaneously pressurized without overloading the conventional slack adjustor cam rod braking mechanism which mechanism is actuated by rod 55 and hence receives the force exerted by the brake cylinder when brake actuating rod 55 is extended. Such overloading of the mechanism is prevented since upon pressurization of service chamber 40 and pressurization of auxiliary chamber 45 each chamber transmits force to the slack adjuster cam rod braking mechanism by means of a common brake actuating rod 55. It will be understood that due to the common brake actuating rod connection both service chamber 40 and auxiliary chamber 45 can be simultaneously pressurized without the force exerted by one being added to the force exerted by the other to cause an excessive force that would damage the braking mechanism. It will further be understood that if the service chamber 40 and auxiliary chamber 45 did not exert their forces by means of a common brake actuating rod 55, as would be the case if service chamber 40 were contained in a separate casing provided with a first brake actuating rod and if auxiliary chamber 45 were contained in a second separate casing provided with a second actuating rod, then the simultaneous pressurization of both chambers would exert additive forces that would overload and damage the slack adjuster cam rod braking mechanism.

While the form of embodiment of the present invention as herein disclosed constitutes a preferred form, it is to be understood that other forms might be adopted, all coming within the scope of the claims which follow:

I claim:

1. A fluid actuated brake motor comprising, in combination, a first moveable wall; a second moveable wall, said first and second walls defining a chamber for receiving pressurized fluid; a third moveable wall forming a portion of the confines of a second chamber for receiving pressurized fluid; a normally open vent means for releasing fluid from between said second and third moveable walls; a brake actuating member moveable to a brake actuating position by pressurization of either of said chambers and means for closing said vent means responsive to pressurization of either of said chambers.

2. A fluid actuated brake motor comprising, in combination, a first moveable wall; a second moveable wall, said first and second walls defining a chamber for receiving pressurized fluid; a third moveable wall forming a portion of the confines of a second chamber for receiving pressurized fluid; normally open vent means for releasing fluid from between said second and third moveable walls; a brake actuating member moveable to a brake actuating position by movement of said moveable walls; and vent control means operatively connecting said vent means with said member for closing said vent means responsive to movement of said member towards said brake actuating position.

3. A fluid actuated brake motor for a vehicle, said motor comprising, in combination, a casing adapted to be mounted to the frame of said vehicle; a plurality of moveable walls forming within said casing a first chamber for receiving pressurized fluid from a service fluid supply and a second chamber for receiving pressurized fluid from an auxiliary fluid supply; a brake actuating member extendable from a normal position, relative to said casing, to a brake actuating position upon pressurization of either of said chambers; valve means for venting fluid from between certain of said walls in the event fluid escapes from said chambers to a space between said walls, said valve means being open when said member is in said normal position; and valve actuating means connecting said valve means to said member for closing said valve means responsive to movement of said member towards said brake actuating position.

4. A fluid actuated brake motor for a vehicle, said motor comprising, in combination, a casing adapted to be mounted to the frame of said vehicle; a plurality of moveable walls forming within said casing a first chamber for receiving pressurized fluid from a service fluid supply and a second chamber for receiving pressurized fluid from an auxiliary fluid supply; a brake actuating member extendable from a normal position, relative to said casing, to a brake actuating position upon pressurization of either of said chambers; valve means for venting fluid from between certain of said walls in the event fluid escapes from said chambers to a space between said walls, said valve means being open when said member is in said normal position; and valve actuating means connecting said valve means to said member for closing said valve means responsive to movement of said member towards said brake actuating position, said valve actuating means including a lost motion connection.

5. A fluid actuated brake motor for a vehicle, said motor comprising, in combination, a casing adapted to be mounted to the frame of said vehicle; a plurality of moveable walls forming within said casing a first chamber for receiving pressurized fluid from a service fluid supply and a second chamber for receiving pressurized fluid from an auxiliary fluid supply; a brake actuating member extendable from a normal position, relative to said casing, to a brake actuating position upon pressurization of either of said chambers; valve means for venting fluid from between certain of said walls in the event fluid escapes from said chambers to a space between said walls, said valve means being open when said member is in said normal position and including a valve actuating rod; spring means for moving said valve actuating rod relative to said casing; guide means carried by said casing; a first valve actuating member moveably carried on said guide and engaging said spring for applying force to said spring means; and a second valve actuating member connecting said first valve actuating member to said brake actuating member, said valve actuating members serving to close said valve means responsive to movement of said brake actuating member to said brake actuating position.

6. A fluid actuated brake motor for a vehicle, said motor comprising, in combination, a casing adapted to be mounted to the frame of said vehicle; a plurality of moveable walls forming within said casing a first chamber for receiving pressurized fluid from a service fluid supply and a second chamber for receiving pressurized fluid from an auxiliary fluid supply; a brake actuating member extendable from a normal position, relative to said casing, to a brake actuating position upon pressurization of either of said chambers; valve means for venting fluid from between certain of said walls in the event fluid escapes from said chambers to a space between said walls, said valve means being open when said member is in said normal position; a first tubular member mounted on said casing; a valve actuating rod extending from said valve means through said first tubular member; spring means between said first tubular member and said valve actuating rod for urging said rod in one direction towards a first position wherein said valve means is closed; a second tubular member moveably surrounding said first tubular member and engageable with said valve actuating rod for moving said rod towards a second position wherein said valve means is open; and means connecting said second tubular member to said brake actuating rod for releasing said spring means to close said valve means upon movement of said brake actuating member towards said brake actuating position.

7. The apparatus defined in claim 6 wherein a second spring means is operative between said first and second tubular members for moving said second tubular member and valve actuating rod towards said second position wherein said valve means is open.

8. A fluid actuated brake motor for a vehicle, said motor comprising, in combination, first and second casing portions including confronting peripheral flanges; a plurality of flexible diaphragms having peripheral edges disposed between said flanges and forming within said casing a first chamber for receiving pressurized fluid from a service fluid supply and a second chamber for receiving pressurized fluid from an auxiliary fluid supply; a brake actuating member extendable from a normal position relative to said casing upon pressurization of either of said chambers; a hollow member extending through certain of said flanges and including a port communicating with a space between certain of said flexible diaphragms.

9. A fluid actuated brake motor for a vehicle, said motor comprising, in combination, first and second casing portions including confronting peripheral flanges; a plurality of flexible diaphragms having peripheral edges disposed between said flanges and forming within said casing a first chamber for receiving pressurized fluid from a service fluid supply and a second chamber for receiving pressurized fluid from an auxiliary fluid supply; a brake actuating member extendable from a normal position relative to said casing upon pressurization of either of said chambers; a hollow member extending through certain of said flanges and communicating with a space between certain of said flexible diaphragms; and a valve element for closing said vent.

10. A fluid actuated brake motor for a vehicle, said motor comprising, in combination, first and second casing portions including confronting peripheral flanges; a plurality of flexible diaphragms having peripheral edges disposed between said flanges and forming within said casing a first chamber for receiving pressurized fluid from a service fluid supply and a second chamber for receiving pressurized fluid from an auxiliary fluid supply; a brake actuating member extendable from a normal position relative to said casing upon pressurization of either of said chambers; a hollow member extending through certain of said flanges and forming a vent communicating with a space between certain of said flexible diaphragms; a valve element for closing said vent; and means for actuating said valve element responsive to pressurization of certain of said chambers.

References Cited in the file of this patent

UNITED STATES PATENTS

| | | |
|---|---|---|
| 2,341,502 | Ingres | Feb. 8, 1944 |
| 2,571,885 | Ingres | Oct. 16, 1951 |
| 2,626,021 | McAlpine | Jan. 20, 1953 |
| 2,649,169 | Holman | Aug. 18, 1953 |
| 2,658,525 | Shannon | Nov. 10, 1953 |
| 2,726,738 | Fawick | Dec. 13, 1955 |